(12) United States Patent
Cline

(10) Patent No.: US 9,709,101 B2
(45) Date of Patent: Jul. 18, 2017

(54) CLUTCH ASSEMBLY WITH GROOVED FRICTION SURFACES

(71) Applicant: Exedy Globalparts Corporation, Belleville, MI (US)

(72) Inventor: Evan Cline, Brighton, MI (US)

(73) Assignee: EXEDY GLOBALPARTS CORPORATION, Belleville, MI (US)

( * ) Notice: Subject to any disclaimer, the term of this patent is extended or adjusted under 35 U.S.C. 154(b) by 41 days.

(21) Appl. No.: 14/731,599

(22) Filed: Jun. 5, 2015

(65) Prior Publication Data

US 2016/0356321 A1     Dec. 8, 2016

(51) Int. Cl.
*F16D 13/70* (2006.01)
*F16D 13/64* (2006.01)
*F16D 13/38* (2006.01)
*F16D 69/00* (2006.01)

(52) U.S. Cl.
CPC ............. *F16D 13/70* (2013.01); *F16D 13/64* (2013.01); *F16D 13/38* (2013.01); *F16D 2069/004* (2013.01); *F16D 2300/10* (2013.01)

(58) Field of Classification Search
CPC .......... F16D 13/46; F16D 13/50; F16D 13/72; F16D 13/74; F16D 2300/02–2300/0214; F16D 13/70
USPC ......................................... 192/113.22, 24, 26
See application file for complete search history.

(56) References Cited

U.S. PATENT DOCUMENTS 3,850,277 A * 11/1974 Adachi .................. F16D 13/58
                                                          192/107 M
3,897,860 A    8/1975 Borck et al.
3,981,381 A * 9/1976 Nosek ..................... F16D 13/72
                                                          192/113.36
4,139,085 A    2/1979 Kanbe et al.
4,529,074 A * 7/1985 Alas ........................ F16D 13/71
                                                          192/70.12
4,560,048 A   12/1985 Flotow et al.
5,099,973 A * 3/1992 Flotow .................... F16D 13/50
                                                          192/107 R
5,279,182 A * 1/1994 Fukushima ............. F16D 13/72
                                                          192/113.23
8,365,895 B2* 2/2013 Bibby ..................... F16D 13/71
                                                          192/113.22
2012/0186386 A1    7/2012 McCombs

FOREIGN PATENT DOCUMENTS

JP          2005195099 A       7/2005

OTHER PUBLICATIONS

Patent Abstract for JP2005195099, date of publication of application: Jul. 21, 2005, 2 pages.
International Search Report dated Sep. 13, 2016, Form PCT/ISA/220, 13 pages.

* cited by examiner

*Primary Examiner* — Richard Lorence
*Assistant Examiner* — David Morris
(74) *Attorney, Agent, or Firm* — Butzel Long

(57) ABSTRACT

A clutch assembly for transmitting power from an output shaft of an engine to an input shaft of a gearbox includes annular friction surfaces on at least one of the flywheel and the pressure plate. The annular friction surface has a plurality of grooves that extend across the annular friction surface away from an inner rim of the friction surface toward an outer rim of the friction surface to prevent a reduction in friction caused by outgassing or abraded particles trapped between engaging friction surfaces.

12 Claims, 5 Drawing Sheets

CLUTCH ASSEMBLY WITH GROOVED FRICTION SURFACES

CROSS-REFERENCE TO RELATED APPLICATIONS

Not Applicable.

FIELD OF THE DISCLOSURE

This disclosure relates to dry friction clutches that are useful for transmitting power from an engine to a gearbox.

BACKGROUND OF THE DISCLOSURE

Dry friction clutches are useful for allowing selective engagement of an input shaft of a gearbox. The clutch assembly typically includes a pressure plate that is axially movable towards and away from a flywheel coupled to an output shaft of an engine, and a friction disc positioned between the pressure plate and the flywheel and coupled to an input shaft of a gearbox. The pressure plate is normally urged toward the flywheel to maintain engagement between friction disc and the flywheel to transmit power from the output shaft of the engine to an input shaft of the gearbox. The friction disc has friction surfaces on opposite sides of the disc which typically engage annular friction surfaces on the flywheel and the pressure plate, respectively, when the pressure plate is urged toward the flywheel. In a vehicle having a manual transmission, a clutch pedal is pressed to cause the pressure plate to be axially moved away from the flywheel to disengage the output shaft of the engine from the input shaft of the gearbox and allow a different gear in the gearbox to be selected for engagement of the gearbox input shaft to a gearbox output shaft.

When the friction disc is brought into engagement with the flywheel and pressure plate there is a short period when the engaging friction surfaces contact each other but are not fully engaged allowing relative movement of the friction disc with respect to the flywheel and pressure plate. During these short periods in which relative movement of contacting friction surfaces occurs, abrasion and generation of particles occurs. These particles can become trapped between the engaged friction surfaces on one side of the clutch disc and the flywheel, and between the engaged friction surfaces on the other side of the clutch and the pressure plate, causing a reduction in friction, which can lead to slippage and further abrasion. Outgassing during this period can also cause reduced friction.

Known solutions have generally involved adjusting clutch operation to increase the force urging the pressure plate toward the flywheel. To the knowledge of the inventors, there are not any known structural features for facilitating removal of particles and gasses that become trapped between the friction surfaces of the flywheel and friction disc or between the friction surfaces of the pressure plate and the friction disc.

SUMMARY OF THE DISCLOSURE

There is provided an improved clutch assembly in which reduction of frictional engagement due to outgassing and/or abraded particles trapped between engaging friction surfaces of the clutch assembly is prevented or ameliorated. This improvement is achieved by providing grooves that extend across the annular friction surface of the pressure plate and/or grooves that extend across the annular friction surface of the flywheel. The grooves maintain a high coefficient of friction over the lifetime of the friction disc. The grooves can help remove glaze formation (binder from the friction disc that has melted and resolidified of friction surfaces) and expose fresh friction surface.

DETAILED DESCRIPTION OF THE ILLUSTRATED EMBODIMENT

Figure 1:
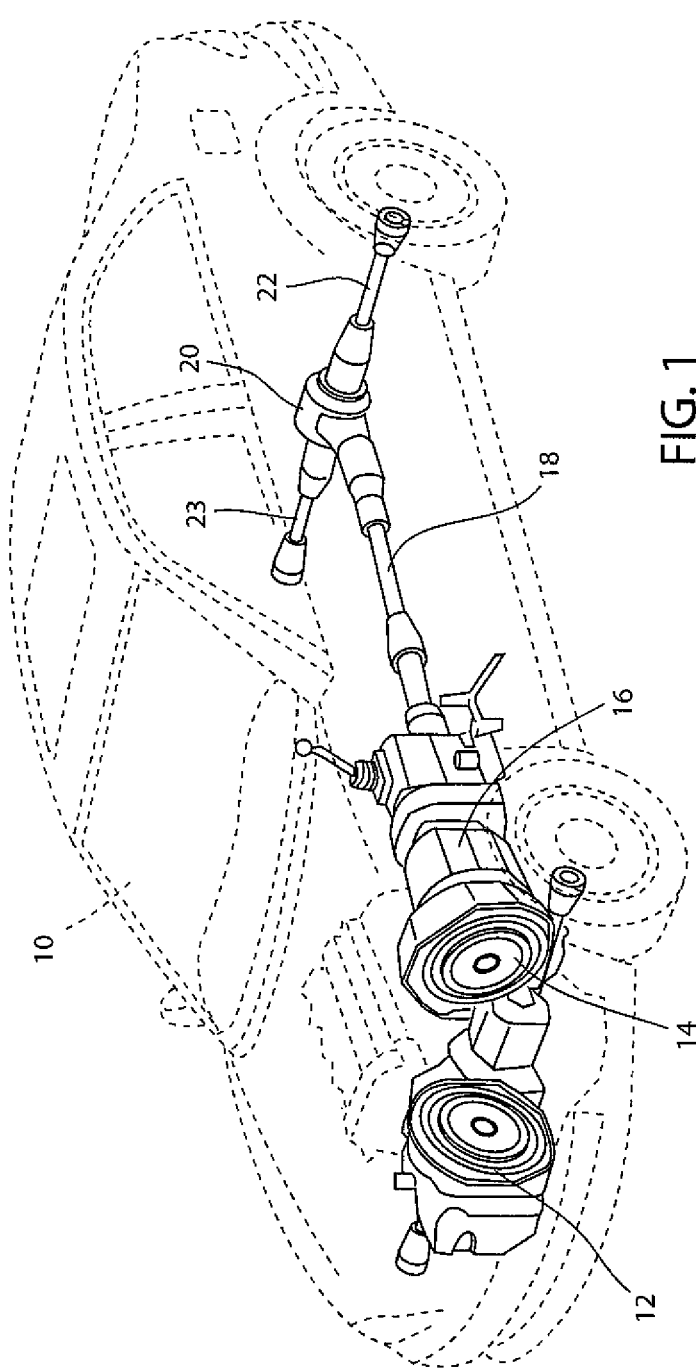
FIG. 1 is a perspective illustration of an automobile having a clutch assembly for transmitting power from an engine to a gearbox input shaft.

An automobile 10 having an engine 12, clutch assembly 14, transmission 16, drive shaft 18, differential 20 and axle shafts 22, 23 is schematically illustrated in FIG. 1.

Figure 2:
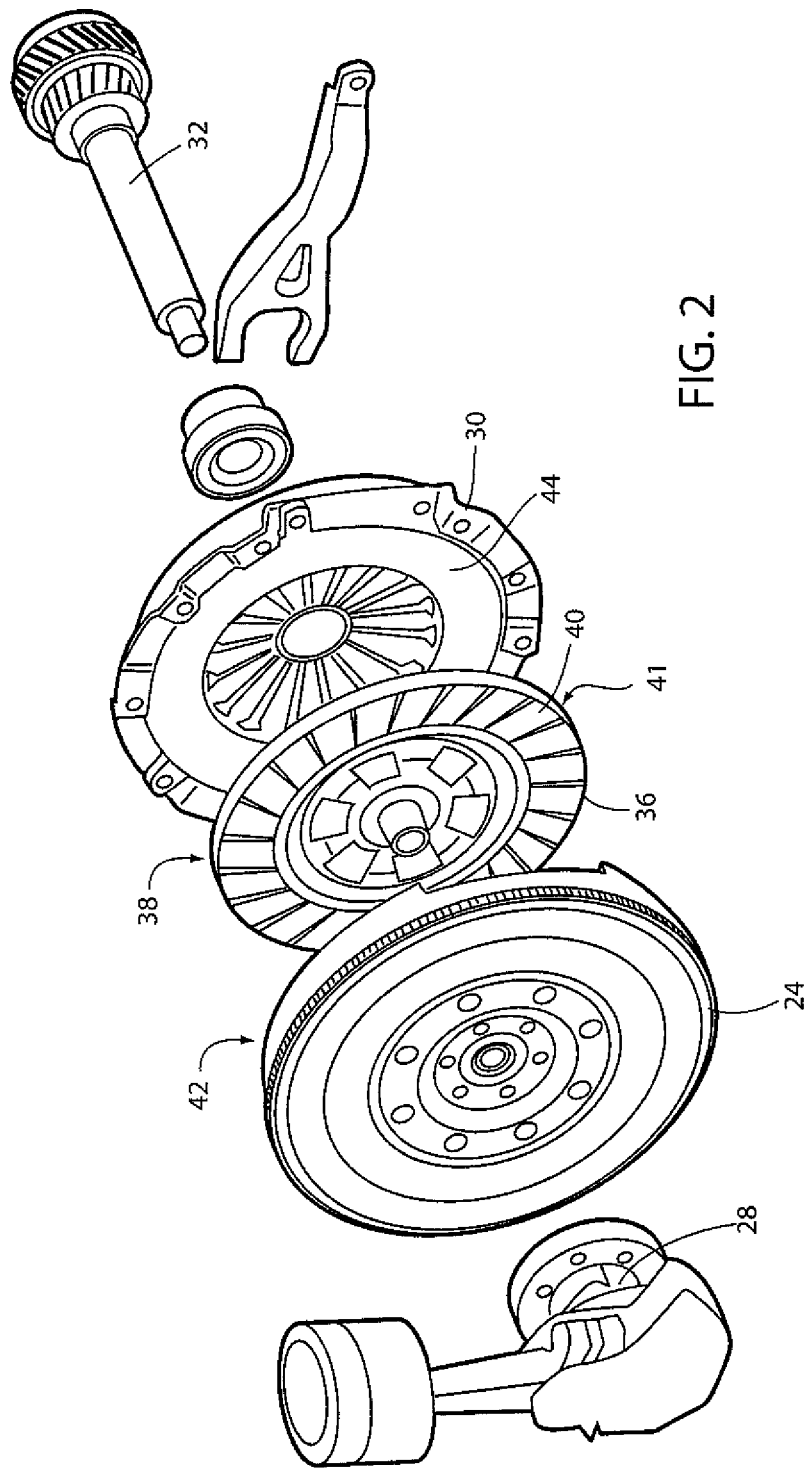
FIG. 2 is an expanded assembly diagram of a flywheel and clutch assembly

A flywheel 24 and clutch assembly 26 are illustrated in FIG. 2. Flywheel 24 is coupled to crankshaft (engine output shaft) 28. A pressure plate 30 is axially movable (i.e., movable along an axis coinciding with or parallel with the crankshaft axis, as well as the input shaft 32 of the gearbox or transmission 16) toward and away from the flywheel 24. Pressure plate 30 has a friction surface 32 that is normal to the axis of the engine output shaft. Disposed between pressure plate 30 and flywheel 24 is a friction disc 34 that is coupled to gearbox input shaft 32. Friction disc 34 has opposite sides 36, 38 that each carry friction surfaces 40, 41, respectively. Friction surface 40 is generally annular and engages an annular friction surface 42 on flywheel 24. Similarly, friction surface 41, which faces toward pressure plate 30 is generally annular and engages an annular friction surface 44 on pressure plate 30.

Figure 3:
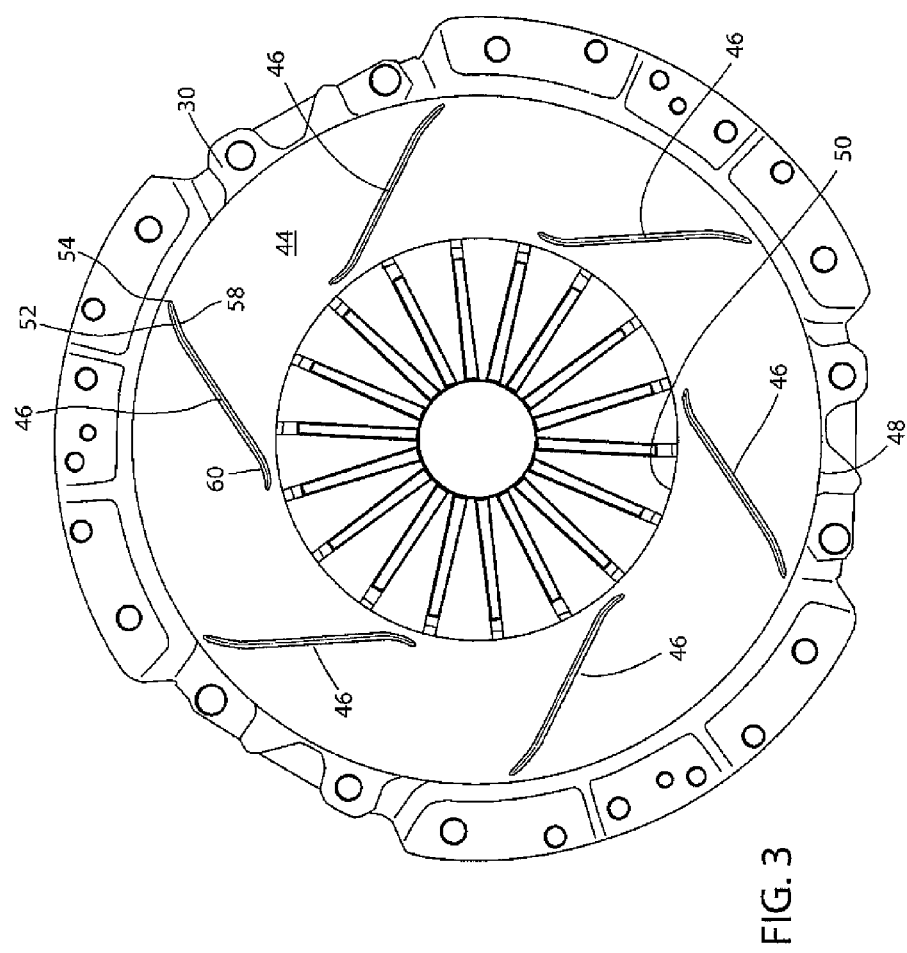
FIG. 3 is a plan view of a pressure plate having grooves in a friction surface.

The annular friction surface 44 of pressure plate 30 is provided with a plurality of grooves 46 that extend across friction surface 44 as shown in FIG. 3.

In the illustrated embodiment, and in accordance with an aspect of this disclosure, each of the grooves 46 extends across friction surface 44 of pressure plate 30 along a direction that is at an acute angle relative to a radius of pressure plate 30 that passes through the groove. The angle can be from about 30 degrees to about 60 degrees, or from about 40 degrees to about 50 degrees.

Friction surface 44 can be defined between an inner rim 50 and an outer rim 48, with each of the grooves 46 extending across most (a majority) of the distance between outer rim 48 and inner rim 50, such as at least 80% of the distance or at least 90% of the distance.

Each groove 46 can have a first straight section 52 adjacent the inner rim 50 that extends perpendicularly to a radius of the pressure plate 30 that passes through the end 54 of the groove 46 nearest inner rim 50, a second straight section 56 that extends at an acute angle relative to the radius, and a curved transition section 58 between the first section 52 and second section 56 of groove 46. A third straight section 60 adjacent the outer rim 48 can extend at an angle relative to the radius that is greater than the acute angle at which the second section 56 extends relative to the radius.

The plurality of grooves 46 on friction surface 44 of pressure plate 30 can be 2, 3 or at least 4, such as 6.

Figure 4:
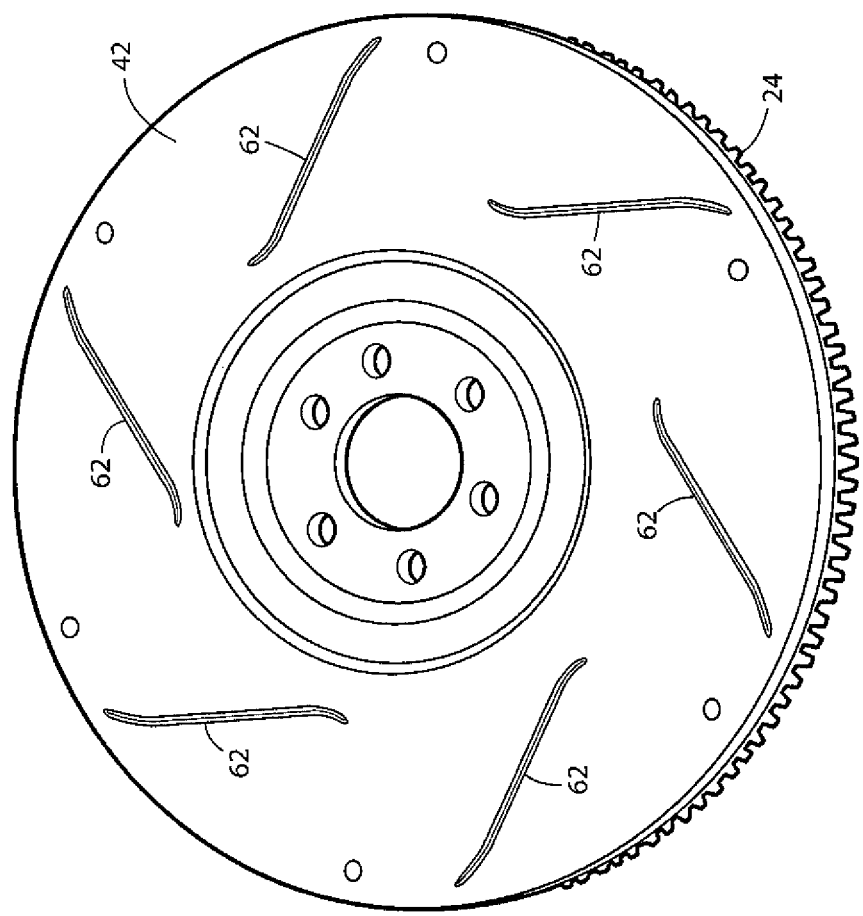
FIG. 4 is a perspective view of a flywheel having grooves in a friction surface.
Figure 5:
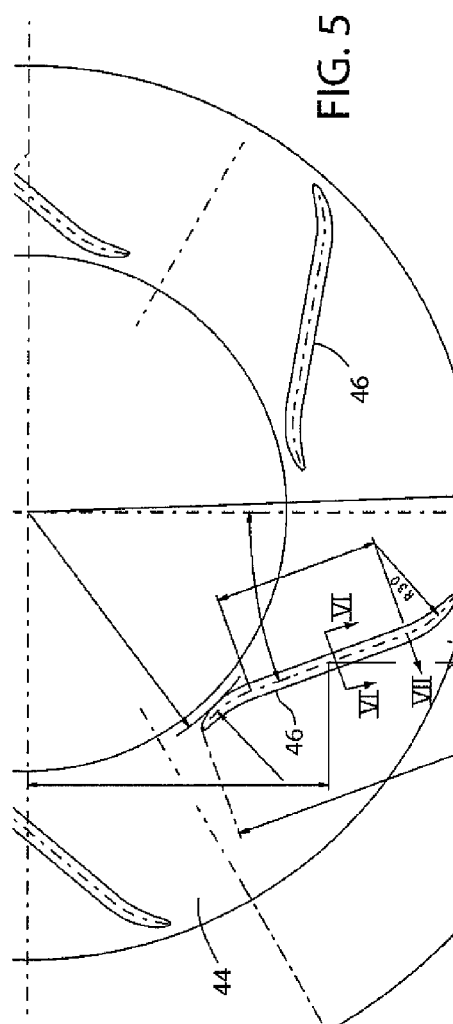
FIG. 5 is a detailed plan view of the pressure plate shown in FIG. 3.
Figure 7:
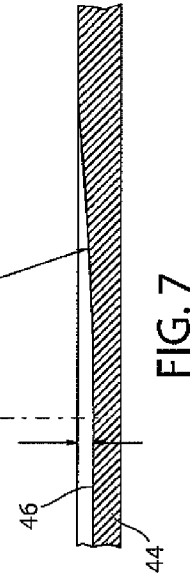
FIG. 7 is a longitudinal cross-sectional view of the groove shown in FIG. 5.
Figure 6:
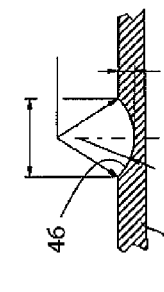
FIG. 6 is a transverse cross-sectional view of a groove shown in FIG. 5.

As shown in FIG. 4, friction surface 42 of flywheel 24 can be provided with a plurality of grooves 62 that can be structurally and functionally identical to grooves 46 of pressure plate 30.

The foregoing description of the specific embodiments of the invention have been presented for purposes of illustration and description. They are not intended to be exhaustive or to limit the claims to the precise forms disclosed, and obviously many modifications and variations are possible in light of the above teaching.

What is claimed is:

1. A clutch assembly for transmitting power from an output shaft of an engine to an input shaft of a gearbox, comprising:
    a pressure plate that is axially movable toward and away from a flywheel coupled to the output shaft of the engine, the pressure plate having an inner rim, an outer rim, and a friction surface normal to the axis of the output shaft;
    a friction disc positioned between the pressure plate and the flywheel, and coupled to the input shaft of the gearbox, the friction disc having opposite sides for facing the flywheel and the pressure plate, one of the opposite sides having a friction surface for engaging the friction surface of the pressure plate and the other of the opposite sides having a friction surface for engaging a friction surface on the flywheel; and
    a plurality of grooves that extend across the friction surface of the pressure plate; wherein the friction surface of the pressure plate is defined between the inner rim and the outer rim, and each of the plurality of grooves extends across most of the distance between the inner rim and the outer rim, and wherein each of the plurality of grooves has a first section adjacent the inner rim which extends perpendicularly to a radius of the pressure plate that passes through an end of the groove nearest the inner rim, a second section that extends at an acute angle relative to the radius, a curved transition section between the first and second sections of the groove, and a third section adjacent the outer rim which extends at an angle relative to the radius that is greater than the acute angle at which the second section extends relative to the radius.

2. The clutch assembly of claim 1, in which the acute angle is from about 30 degrees to about 60 degrees.

3. The clutch assembly of claim 1, in which the acute angle is from about 40 degrees to about 50 degrees.

4. The clutch assembly of claim 1, in which each of the plurality of grooves extends across at least 80% of the distance between the inner rim and the outer rim.

5. The clutch assembly of claim 1, in which each of the plurality of grooves extends across at least 90% of the distance between the inner rim and the outer rim.

6. The clutch assembly of claim 1, having at least four grooves that extend across the friction surface of the pressure plate.

7. A flywheel and clutch assembly for transmitting power from an output shaft of an engine to an input shaft of a gearbox, comprising:
    a flywheel coupled to the output shaft of the engine, the flywheel having a friction surface normal to the axis of the output shaft;
    a pressure plate that is axially movable toward and away from the flywheel, the pressure plate having an inner rim, an outer rim, and a friction surface normal to the axis of the output shaft;
    a friction disc positioned between the pressure plate and the flywheel, and coupled to the input shaft of the gearbox, the friction disc having opposite sides for facing the flywheel and the pressure plate, one of the opposite sides having a friction surface for engaging the friction surface of the pressure plate and the other of the opposite sides having a friction surface for engaging the friction surface on the flywheel; and
    a plurality of grooves that extend across the friction surface of the flywheel, wherein the friction surface of the flywheel is defined between the inner rim and the outer rim, and each of the plurality of grooves extends across most of the distance between the inner rim and the outer rim, each of the plurality of grooves has a first section adjacent the inner rim which extends perpendicularly to a radius of the flywheel that passes through an end of the groove nearest the inner rim, a second section that extends at an acute angle relative to the radius, a curved transition section between the first and second sections of the groove, and a third section adjacent the outer rim which extends at an angle relative to the radius that is greater than the acute angle at which the second section extends relative to the radius.

8. The flywheel and clutch assembly of claim 7, in which the acute angle is from about 30 degrees to about 60 degrees.

9. The flywheel and clutch assembly of claim 7, in which the acute angle is from about 40 degrees to about 50 degrees.

10. The flywheel and clutch assembly of claim 7, in which each of the plurality of grooves extends across at least 80% of the distance between the inner rim and the outer rim.

11. The flywheel and clutch assembly of claim 7, in which each of the plurality of grooves extends across at least 90% of the distance between the inner rim and the outer rim.

12. The flywheel and clutch assembly of claim 7, having at least four grooves that extend across the friction surface of the flywheel.

* * * * *